US008577762B2

(12) United States Patent  
Baar et al.

(10) Patent No.: US 8,577,762 B2  
(45) Date of Patent: Nov. 5, 2013

(54) DETAIL-IN-CONTEXT LENSES FOR INTERACTING WITH OBJECTS IN DIGITAL IMAGE PRESENTATIONS

(75) Inventors: David Baar, Vancouver (CA); Ali Solehdin, Vancouver (CA)

(73) Assignee: Noregin Assets N.V., L.L.C., Dover, DE (US)

( * ) Notice: Subject to any disclaimer, the term of this patent is extended or adjusted under 35 U.S.C. 154(b) by 644 days.

(21) Appl. No.: 11/935,222

(22) Filed: Nov. 5, 2007

(65) Prior Publication Data

US 2008/0077871 A1 Mar. 27, 2008

Related U.S. Application Data

(62) Division of application No. 10/667,887, filed on Sep. 23, 2003, now Pat. No. 7,310,619.

(30) Foreign Application Priority Data

Sep. 30, 2002 (CA) .................................... 2406047  
Sep. 30, 2002 (CA) .................................... 2406131

(51) Int. Cl.
*G06Q 40/00* (2012.01)
(52) U.S. Cl.
USPC .............. 705/35; 382/299; 345/660; 345/671
(58) Field of Classification Search
USPC ............ 345/660, 671, 88, 418; 382/299, 215, 382/217; 282/299; 705/35, 26; 349/73, 106; 715/810; 359/722
See application file for complete search history.

(56) References Cited

U.S. PATENT DOCUMENTS

| 3,201,546 A | 8/1965 | Richardson |
| 3,704,938 A | 12/1972 | Fanselow |
| 3,739,739 A | 6/1973 | Brase |
| 3,762,799 A | 10/1973 | Shapiro |
| 4,581,647 A | 4/1986 | Vye |

(Continued)

FOREIGN PATENT DOCUMENTS

| CA | 2350342 | 11/2002 |
| CA | 2386560 | 11/2003 |

(Continued)

OTHER PUBLICATIONS

Carpendale, Marianne S. T., "A Framework for Elastic Presentation Space", Burnaby, B.C.: Simon Fraser University, 1999.

(Continued)

*Primary Examiner* — Behrang Badii  
(74) *Attorney, Agent, or Firm* — McAndrews, Held & Malloy, Ltd.

(57) ABSTRACT

Methods for initiating an electronic shopping transaction, for initiating a control operation for a user-selectable video game character, for emphasizing an advertisement in a computer generated display, and for presenting multiple GUIs in desktop user interfaces using detail-in-context graphical distortions. The method for initiating an electronic shopping transaction, for a user-selectable item presented in a computer generated original image on a display, comprising: receiving a selection signal for the item from a user; distorting the original image to produce a distorted region for the item to provide the user with detailed information for the item; and, receiving a purchase signal for the item from the user.

20 Claims, 12 Drawing Sheets

(56) References Cited

U.S. PATENT DOCUMENTS

| | | |
|---|---|---|
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |
| 4,970,028 A | 11/1990 | Kenyon et al. |
| 4,985,849 A | 1/1991 | Hideaki |
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |
| 5,185,599 A | 2/1993 | Doornink et al. |
| 5,185,667 A | 2/1993 | Zimmermann |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick et al. |
| 5,651,107 A | 7/1997 | Frank et al. |
| 5,652,851 A | 7/1997 | Stone et al. |
| 5,657,246 A | 8/1997 | Hogan et al. |
| 5,670,984 A | 9/1997 | Robertson et al. |
| 5,680,524 A | 10/1997 | Maples et al. |
| 5,682,489 A | 10/1997 | Harrow et al. |
| 5,689,287 A | 11/1997 | Mackinlay et al. |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,959,605 A | 9/1999 | Gilblom |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver et al. |
| 6,133,914 A | 10/2000 | Rogers et al. |
| 6,147,709 A | 11/2000 | Martin et al. |
| 6,154,840 A | 11/2000 | Pebly et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 | 6/2003 | Kashiwagi et al. |
| 6,584,237 B1 * | 6/2003 | Abe .............................. 382/299 |
| 6,590,568 B1 | 7/2003 | Astala et al. |
| 6,590,583 B2 * | 7/2003 | Soohoo ........................ 345/660 |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfield |

(56) References Cited

U.S. PATENT DOCUMENTS

| | | |
|---|---|---|
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen et al. |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar et al. |
| 7,698,653 B2 | 4/2010 | Roman et al. |
| 7,714,859 B2 | 5/2010 | Shoemaker |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0030699 A1* | 3/2002 | Van Ee ............ 345/810 |
| 2002/0033837 A1 | 3/2002 | Munro |
| 2002/0038257 A1* | 3/2002 | Joseph et al. ............ 705/26 |
| 2002/0044154 A1 | 4/2002 | Baar et al. |
| 2002/0060680 A1* | 5/2002 | Soohoo ............ 345/428 |
| 2002/0062245 A1* | 5/2002 | Niu et al. ............ 705/14 |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0109680 A1* | 8/2002 | Orbanes et al. ............ 345/418 |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0046968 A1* | 3/2005 | Beatson et al. ............ 359/722 |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle |
| 2009/0265656 A1 | 10/2009 | Jetha |
| 2009/0284542 A1 | 11/2009 | Baar |
| 2010/0026718 A1 | 2/2010 | Jetha et al. |
| 2010/0033503 A1 | 2/2010 | Baar et al. |
| 2010/0045702 A1 | 2/2010 | Doyle et al. |
| 2010/0201785 A1 | 8/2010 | Lantin |

(56) References Cited

U.S. PATENT DOCUMENTS

| | | | |
|---|---|---|---|
| 2010/0208968 | A1 | 8/2010 | Shoemaker et al. |
| 2010/0262907 | A1 | 10/2010 | Shoemaker et al. |

FOREIGN PATENT DOCUMENTS

| | | |
|---|---|---|
| CA | 2393708 | 1/2004 |
| CA | 2394119 | 1/2004 |
| EP | 0635779 | 1/1995 |
| EP | 0650144 | 4/1995 |
| EP | 0816983 | 1/1998 |
| EP | 0816983 A2 | 1/1998 |
| EP | 0816983 | 7/1998 |
| JP | 4410465 | 2/2010 |

OTHER PUBLICATIONS

Robertson, et al., ""The Document Lens"", (1993),pp. 101-108.
Carpendale, M.S.T et al., ""A Framework for Unifying Presentation Space"", 01UIST. Proceedings of the 14th Annual ACM Symposium on User Interface Software and Technology, Proceedings of UIST '01: ACM Symposium on User Interface Software and Technology, Orlando, FL USA; XP002249323 2001, New York, NY, USA ISBN: 1-58113-438-X,(Nov. 14, 2001),pp. 61-70; p. 64.
Ikedo, T ""A Realtime Video-Image Mapping User Polygon Rendering Techniques"", IEEE Intl. conf on Ottawa, ONT, Canada Jun. 3-6, 1997, Los Alamitos, CA, USA; IEEE Comput. Soc, US. XP010239181, ISBN: 0-8186-7819-4 Sections 2, 4.4; Multimedia Computing and Systems '97 Proceedings, (Jun. 3, 1997),pp. 127-134.
Bouju, A. et al., ""Client-Server Architecture for Accessing Multimedia and Geographic Databases within Embedded Systems"", Database and Expert Systems Applications, 1999 Proceedings. Tenth International Workshop on Florence, Italy Sep. 1-3, 1999, Los Alamitos, CA, USA, IEEE Comput. Soc, US, XP010352370; ISBN:0-7695-0281-4, abstract, figure 2,(Sep. 1-3, 1999),pp. 760-764.
Robertson, G et al., "The Document Lens", UIST. Proceedings of the Annual ACM Symposium on User Interface Software and Technology. abstract figures 3,4,(Nov. 3, 1993),pp. 101-108.
Dursteler, Juan C., "The digital magazine of Infovis.net", Retrieved from: http://www.infovis.net/printMag.php?num=85&lang=2; (Apr. 22, 2002).
"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).
Kuederle, Oliver ""Presentation of Image Sequences: A Detail-in-Context Approach"", Thesis, Simon Fraser University; (Aug. 2000),pp. 1-3, 5-10, 29-31.
Microsoft Corp., "Microsoft Paint", Microsoft Corp.,(1981-1998),Paint 1-14.
"Electronic Magnifying Glasses", IBM Technical Disclosure Bulletin, IBM Corp., New York, US, vol. 37, No. 3; XP000441501, ISSN: 0018-8689 the whole document; (Mar. 1, 1994),pp. 353-354.
Keahey, T. A., ""The Generalized Detail-In-Context Problem"", Information Visualization 1998, Proceedings; IEEE Symposium on Research Triangle, CA, USA; Los Alamitos, CA, USA, IEEE Comput. Soc, US; XP010313304; ISBN: 0-8186-9093,(Oct 19-20, 1998),pp. 44-51, 152.
Carpendale, et al., ""3-Dimensional Pliable Surfaces: For the Effective Presentation of Visual Information"", Proceedings of the 8th annual ACM symposium on User interface and software technology, (Dec. 1995).
Carpendale, M S T et al., ""Extending distortion viewing from 2D to 3D"", IEEE Computer Graphics and Applications, IEEE Inc. New York, US, vol. 17, No. 4; XP000927815, ISSN:0272-1716. (Jul. 1997),pp. 42-51.
Viega, J et al., ""3D magic lenses"", Proceedings of the 9th annual ACM symposium on User interface software and technology; Pub 1996 ACM Press New York, NY, USA; (1996),51-58.

Cowperthwaite, David J., ""Occlusion Resolution Operators for Three-Dimensional Detail-In-Context"", Burnaby, British Columbia: Simon Fraser University; (2000).
Carpendale, M.S.T. ""A Framework for Elastic Presentation Space"", Thesis Simon Fraser University, XP001051168; cited in the application, Chapter 3-5;appendix A,B; (Mar. 1999),pp. 1-271.
Carpendale, M.S.T. et al., ""Exploring Distinct Aspects of the Distortion Viewing Paradigm"", Technical Report TR 97-08, School of Computer Science, Simon Fraser University, Burnaby, British Columbia, Canada; (Sep. 1997).
Cowperthwaite, David J., et al., ""Visual Access for 3D Data"", In Proceedings of ACM CHI 96 Conference on Human Factors in Computer Systems, vol. 2 of Short Papers: Alternative Methods of Interaction; (1996), pp. 175-176.
Keahey, T. A., ""Visualization of High-Dimensional Clusters Using NonLinear Magnification"", Technical Report LA-UR-98/2776, Los Alamos National Laborator; (1998).
Tigges, M. et al., ""Generalized Distance Metrics for Implicit Surface Modeling"", Proceedings of the Tenth Western Computer Graphics Symposium; (Mar. 1999).
Bossen, F. J., ""Anisotropic Mesh Generation With Particles"", Technical Report CMU-CS-96-134, CS Dept, Carnegie Mellon University; (May 1996).
Bossen, F. J., et al., ""A Pliant Method for Anisotropic Mesh Generation"", 5th Intl. Meshing Roundtable; (Oct. 1996),pp. 63-74.
Wilson, et al., ""Direct Volume Rendering Via 3D Textures"", Technical Report UCSC-CRL-94-19, University of California, Santa Cruz, Jack Baskin School of Engineering; (Jun. 1994).
Carpendale, M.S.T. "A Framework for Elastic Presentation Space", PhD thesis, Simon Fraser University; (1999),pp. 69, 72, 78-.83,98-100, 240, and 241.
Keahey, T. A., et al., ""Techniques for Non-Linear Magnification Transformations"", Information Visualization '96, Proceedings IEEE Symposium on, San Francisco, CA, Los Alamitos, CA, USA, IEEE Comput. Soc, US: XP010201943; ISBN: 0-8186-7668-X the whole document,(Oct. 28, 1996),pp. 38-45.
Carpendale, M. Sheelagh T., et al., ""3-Dimensional Pliable Surfaces: for the Effective Presentation of Visual Information"", UIST '95, 8th Annual Symposium on User Interface Software and Technology, Proceedings of the ACM Symposium on User Interface Software and Technology, Pittsburgh, PA, New York, Nov. 14, 1995,pp. 217-226.
Tominski, Christian et al., ""Fisheye Tree Views and Lenses for Graph Visualization"", pp. 1-8.
Keahey, T. A., ""Getting Along: Composition of Visualization Paradigms"", Visual Insights, Inc.; (2001).
Sakamoto, Chikara et al., ""Design and Implementation of a Parallel Pthread Library (PPL) with Parallelism and Portability"", Systems and Computers In Japan, New York, US, vol. 29, No. 2; XP000752780, ISSN: 0882-1666 abstract,(Feb. 1, 1998),pp. 28-35.
Deng, K. et al., ""Texture Mapping with a Jacobian-Based Spatially-Variant Filter",", Proceedings 10th Pacific Conference on Computer Graphics and Applications, Beijing, China, 2002 Los Alamitos, CA, USA, IEEE Comput. Soc, USA; XP00224932, ISBN; 0-7695-1784-6 the whole document,(Oct. 9-11, 2002),pp. 460-461.
Welsh, Michelle "Futurewave Software", Business Wire; (Nov. 15, 1993).
Lamar, et al., "A Magnification Lens for Interactive vol. Visualization", ACM; pp. 1-10.
Fitzmaurice, G. et al., ""Tracking Menus"", UIST; (2003),pp. 71-79.
Stone, et al., "The movable filter as a user interface tool", Proceedings of CHI ACM(1992), pp. 306-312.
Baudisch, P. et al., ""Halo: a Technique for Visualizing Off-Screen Locations"", CHI; (Apr. 5-10, 2003).
Baudisch, P. et al., ""Drag-And-Pop: Techniques for Accessing Remote Screen Content on Touch-And-Pen-Operated System"", Interact '03, (2003).
Carpendale, M.S.T. et al., ""Making Distortions Comprehensible"", Visual Languages, Proceedings, 1997 IEEE Symposium on Isle of Capri, Italy, Sep. 23-26, 1997, Los Alamitos, CA, USA, IEEE Comput. Soc., US, Sep. 23, 1997; XP010250566, ISBN: 0-8186-8144-6,(Sep. 23-26, 1997),pp. 36-45.

(56) References Cited

OTHER PUBLICATIONS

Ito, Minoru et al., ""A Three-Level Checkerboard Pattern (TCP) Projection Method for Curved Surface Measurement"", *Pattern Recognition, Pergamon Press Inc.*, Elmsford, N.Y., US vol. 28, No. 1; XP004014030, ISSN 0031-3203,(1995),pp. 27-40.

Keahey, T A., et al., ""Nonlinear Magnification Fields"", *Information Visualization*, 1997, Proceedings, IEEE Symposium on Phoenix, AZ, USA, Los Alamitos, CA, USA, IEEE Comput. Soc., US; XP010257169; ISBN: 0-8186-8189-6,(Oct. 20-21, 1997),pp. 51-58 and 121.

Rauschenbach, U. ""The Rectangular Fish Eye View as an Efficient Method for the Transmission and Display of Large Images"", *Image Processing, ICIP 99, Proceedings, 1999 International Conference on*, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; (1999),pp. 115-119.

Keahey, T. A., "Nonlinear Magnification", (*Indiana University Computer Science*), (1997).

Watt, et al., "Advanced Animation and Rendering Techniques", (*Addison-Wesley Publishing*), (1992),p. 106-108.

Boots, B. N., "Delauney Triangles: An Alternative Approach to Point Pattern Analysis", *Proc. Assoc. Am. Geogr. 6*, (1974),p. 26-29.

Sheelagh, M. et al., ""Distortion Viewing Techniques for 3-Dimensional Data"", *Information Visualization '96*, Proceedings IEEE Symposium on San Francisco, CA, USA, Los Alamitos, CA, USA, *IEEE Comput. Soc, US* Oct. 28, 1996; XP010201944; ISBN: 0-8186-7668-X,(Oct. 28-29, 1996),pp. 46-53, 119.

Leung, Y. K., et al., ""A Review and Taxonomy of Distortion-Oriented Presentation Techniques"", *ACM Transactions on Computer-Human Interaction*,'Online! vol. 1, No. 2, XP002252314; Retrieved from the Internet: <URL:http://citeseer.nj.nec.com/ leung94review. html> 'retrieved on Aug. 8, 2003! the whole document,(Jun. 1994),pp. 126-160.

"Non Final Office Action", U.S. Appl. No. 10/358,394, Mar. 13, 2009.

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, et al., "Graph Folding: Extending Detail and Context Viewing into a Tool for Subgraph Comparisons", *In Proceedings of Graph Drawing 1995*, Passau Germany, (1995),pp. 127-139.

Carpendale, M.S.T. "A Framework for Elastic Presentation Space", http://pages.cpsc.ucalgary.ca/~sheelagh/personal/thesis/, (Nov. 19, 1999).

"Non Final Office Action", U.S. Appl. No. 11/542,120, (Jan. 22, 2009),20 pages.

"Non-Final Office Action", U.S. Appl. No. 11/410,024, (Mar. 11, 2009),35 pages.

"Foreign Office Action", Application Serial No. 2002-536993, (Mar. 11, 2009),2 pages.

"Notice of Allowance", U.S. Appl. No. 11/401,349, (Apr. 17, 2009),35 pages.

Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.

"Final Office Action",U.S. Appl. No. 10/705,199, (May 12, 2009),46 pages.

"Non Final Office Action", U.S. Appl. No. 11/541,778, (Jun. 19, 2009),36 pages.

"Non Final Office Action", U.S. Appl. No. 11/673,038, (Jul. 13, 2009),45 pages.

"Non Final Office Action", U.S. Appl. No. 11/410,024, (Jul. 20, 2009),27 pages.

Smith, et al., "Efficient techniques for wide-angle stereo vision using surface projection models", Retrieved from <http://ieee.org/stamp. jsp?arnumber=17045, (1999),6 pages.

"Non Final Office Action", U.S. Appl. No. 11/159,205, (Jul. 27, 2009),13 pages.

"Advisory Action", U.S. Appl. No. 11/249,493, (Aug. 11, 2009),5 pages.

"Advisory Action", U.S. Appl. No. 10/705,199, (Aug. 18, 2009),5 pages.

"Advisory Action", U.S. Appl. No. 11/249,493, (Sep. 14, 2009),4 pages.

"Final Office Action", U.S. Appl. No. 11/691,686, (Sep. 1, 2010), 16 pages.

"Non Final Office Action", U.S. Appl. No. 11/138,979, (Sep. 17, 2010), 11 pages.

"Non Final Office Action", U.S. Appl. No. 11/541,778, (Sep. 29, 2010), 10 pages.

"Non Final Office Action", U.S. Appl. No. 11/695,104, (Oct. 1, 2010), 9 pages.

"Final Office Action", U.S. Appl. No. 11/159,205, (Oct. 6, 2010), 16 pages.

"Non Final Office Action", U.S. Appl. No. 11/236,694, (Oct. 13, 2010), 16 pages.

Lieberman, Henry "Power of Ten Thousand—Navigating in Large Information Spaces", *Proceedings of the 7th annual ACM symposium on User interface software and technology*, Marina del Rey California United States (Nov. 1994) , pp. 15-16.

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques Proceedings of the 20th annual conference on Computer graphics and interactive techniques.*, (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96* Vancouver, BC Canada, (1996), pp. 383-390

"Final Office Action", U.S. Appl. No. 12/368,263, (Nov. 5, 2010), 7 pages.

"Final Office Action", U.S. Appl. No. 12/764,724, (Nov. 9, 2010), 21 pages.

"Notice of Allowance", U.S. Appl. No. 11/214,886, (Dec. 15, 2009),16 pages.

"BPAI Decision", U.S. Appl. No. 10/682,298, (Dec. 30, 2009),14 pages.

"Notice of Allowance", U.S. Appl. No. 11/410,024, (Jan. 4, 2010), 7 pages.

"Final Office Action", U.S. Appl. No. 11/673,038, (Jan. 8, 2010), 33 pages.

"Advisory Action", U.S. Appl. No. 11/541,778, (Feb. 1, 2010), 3 pages.

"Restriction Requirement", U.S. Appl. No. 12/368,263, (Mar. 9, 2010), 7 pages.

"Notice of Allowance", U.S. Appl. No. 10/705,199, (Mar. 10, 2010), 18 pages.

"Advisory Action", U.S. Appl. No. 11/249,493, (Sep. 14, 2009), 4 pages.

"Non-Final Office Action", U.S. Appl. No. 12/364,450, (Sep. 30, 2009), 10 pages.

"Notice of Allowance", U.S. Appl. No. 10/358,394, (Oct. 8, 2009), 7 pages.

"Final Office Action", U.S. Appl. No. 11/541,778, (Dec. 4, 2009), 12 pages.

(56) References Cited

OTHER PUBLICATIONS

"Final Office Action", U.S. Appl. No. 11/691,686, (Nov. 22, 2010), 16 pages.

"Non Final Office Action", U.S. Appl. No. 12/368,267, (Jun. 11, 2010), 12 pages.

"Notice of Allowability", U.S. Appl. No. 12/364,450, (Jun. 18, 2010), 2 pages.

"Non Final Office Action", U.S. Appl. No. 12/388,437, (Jun. 23, 2010), 7 pages.

"Non Final Office Action", U.S. Appl. No. 12/764,724, (Jul. 1, 2010), 20 pages.

"Non Final Office Action", U.S. Appl. No. 11/673,038, (Jul. 22, 2010), 39 pages.

"Non Final Office Action", U.S. Appl. No. 11/691,686, (Mar. 18, 2010), 17 pages.

"Advisory Action", U.S. Appl. No. 11/673,038, (Mar. 25, 2010), 7 pages.

"Final Office Action", U.S. Appl. No. 11/159,205, (Mar. 25, 2010), 16 pages.

"Notice of Allowance", U.S. Appl. No. 12/364,450, (Apr. 19, 2010), 4 pages.

"Non-Final Office Action", U.S. Appl. No. 11/236,694. (Apr. 20, 2010), 9 pages.

"Non Final Office Action", U.S. Appl. No. 12168,263, (Apr. 30, 2010), 9 pages.

\* cited by examiner

DETAIL-IN-CONTEXT LENSES FOR INTERACTING WITH OBJECTS IN DIGITAL IMAGE PRESENTATIONS

This application is a divisional of U.S. patent application Ser. No. 10/667,887, filed Sep. 23, 2003, now U.S. Pat. No. 7,310,619 the disclosure of which is incorporated herein by reference. This application claims priority from Canadian Patent Application Nos. 2,406,047 and 2,406,131, both filed Sep. 30, 2002, the disclosures of which are incorporated herein by reference.

FIELD OF THE INVENTION

This invention relates to the field of computer graphics processing, and more specifically, to a method and system for accessing information for interacting with selected objects in digital images using detail-in-context lenses and a detail-in-context graphical user interface ("GUI").

BACKGROUND OF INVENTION

Modern computer graphics systems, including digital video systems, are used for numerous applications such as electronic shopping, viewing movies and television programmes, and playing computer games. In general, these applications are launched by the computer graphics system's operating system upon selection by a user from a menu or other graphical user interface ("GUI"). A GUI is used to convey information to and receive commands from users and generally includes a variety of GUI objects or controls, including icons, toolbars, drop-down menus, text, dialog boxes, buttons, and the like. A user typically interacts with a GUI by using a pointing device (e.g., a mouse) to position a pointer or cursor over an object and "clicking" on the object.

One problem with these computer graphics systems is their inability to effectively display detailed information for selected graphic objects when those objects are in the context of a larger image. A user may require access to detailed information with respect to an object in order to closely examine the object, to interact with the object, or to interface with an external application or network through the object. For example, the detailed information may be a close-up view of the object. It may also be pricing and delivery information for a product displayed by an electronic shopping application. Or, the detailed information could be a control panel for a character in a computer game.

A similar problem arises upon launch of these applications. The menus displayed to launch applications, which are generally comprised of lists of programs (i.e. in the case of operating systems) and function selections (i.e. in the case of software applications), often obscure or occlude other important information on the user's display screen including data, desktop icons, and other graphical objects.

While an application may provide "pop-up" windows or "pull-down" menus for a user to access and view detailed information for a selected object in a larger image, in doing so, the relative location of the object in the larger image may be lost to the user. That is, the pop-up window or pull-down menu may obscure a portion of the larger image necessary for effective interaction with the object. Thus, while the user may have gained access to the detailed information required to interact with the object, the user may lose sight of the context within which that object is positioned in the larger image. This is an example of what is often referred to as the "screen real estate problem".

The screen real estate problem is evident in the interactive electronic shopping system disclosed in U.S. Pat. No. 6,381,583 to Kenney. In Kenney, the interactive electronic shopping system includes: a digital camera to digitize a shopping facility into digital signals representing images of the shopping facility; a central computer data base to store the digital signals; a communication link connected to the central computer data base; a local computer connected to the communication link; and, a control interface connected to the local computer to enable a shopper to control the local computer such that the local computer obtains data from the central computer data base in response to the digital signals stored therein and displays video images of the shopping facility in response to the obtained data. Detailed information concerning a selected item in the shopping facility is displayed to the user in a pop-up window. Unfortunately, the pop-up window obscures a significant portion of the shopping facility image and hence the user may lose sight of the context of the selected item in the larger shopping facility image.

The screen real estate problem is also evident in the video game apparatus disclosed in U.S. Pat. No. 6,612,930 to Kawagoe, et al. In Kawagoe, et al., a number of "virtual cameras" are used to provide a user with detailed views about a game character as it moves through the landscape of the game. Unfortunately, the switching from virtual camera to virtual camera in Kawagoe, et al., neither provides the user with the context of his game character within the larger environment of the game landscape nor improves accessibility to detailed control information for interacting with the game character.

A need therefore exists for an improved method and system for interacting with selected objects in digital images. Consequently, it is an object of the present invention to obviate or mitigate at least some of the above mentioned disadvantages.

SUMMARY OF THE INVENTION

According to one aspect of the invention, there is provided a method for initiating an electronic shopping transaction for a user-selectable item presented in a computer generated original image on a display, comprising: receiving a selection signal for said item from a user; distorting said original image to produce a distorted region for said item to provide said user with detailed information for said item; and, receiving a purchase signal for said item from said user.

Preferably, the step of distorting further includes: creating a lens surface for said distorted region; and, transforming said original image by applying a distortion function defining said lens surface to said original image.

Preferably, the step of creating further includes displaying a graphical user interface ("GUI") over said distorted region for adjusting said lens surface.

Preferably, the lens surface includes a focal region and a base region and said GUI includes: a slide bar icon for adjusting a magnification for said lens surface; a slide bar icon for adjusting a degree of scooping for said lens surface; a bounding rectangle icon with at least one handle icon for adjusting a size and a shape for said focal region; a bounding rectangle icon with at least one handle icon for adjusting a size and a shape for said base region; a move icon for adjusting a location for said lens surface within said original image; a pickup icon for adjusting a location for said base region within said original image; and, a fold icon for adjusting a location for said focal region relative to said base region.

Preferably, the original image includes a DVD image, a video cassette image, a cable television image, a satellite television image, and a video game image.

Preferably, the selection and purchase signals are generated by moving a cursor on said display with a pointing device.

Preferably, the pointing device is a mouse.

Preferably, the distorted region is on said item.

Preferably, the distorted region overlaps said item.

Preferably, the detailed information is said distorted region.

Preferably, the detailed information is purchasing information for said item.

Preferably, the purchasing information includes a price, a product identifier, a delivery period, and a function selection icon.

Preferably, the function selection icon includes a purchase icon and an add-to-shopping-cart icon.

Preferably, the purchasing information is presented in a pop-up window.

Preferably, the pop-up window is presented adjacent to said distorted region.

According to another aspect of the invention, there is provided a method for initiating a control operation for a user-selectable video game character presented in a computer generated original image on a display, comprising: receiving a selection signal for said character from a user; distorting said original image to produce a distorted region for said character to provide said user with detailed information for said character; and, receiving a control signal for said character from said user.

According to another aspect of the invention, there is provided a method for emphasizing an advertisement presented in a computer generated original image on a display, comprising: distorting said original image to produce a distorted region for said advertisement to provide a user with detailed information for said advertisement.

According to another aspect of the invention, there is provided a method for presenting a second GUI over a first GUI on a computer display to avoid occlusion of predetermined elements of said first GUI, comprising: determining whether overlaying said second GUI on said first GUI will occlude said predetermined elements; in response to said determining, distorting said second GUI to produce a distorted GUI having a distorted region avoiding said occlusion of said predetermined elements; and, overlaying said distorted GUI on said first GUI for presentation on said computer display.

Preferably, the step of distorting further includes: creating a lens surface for said distorted region; and, transforming said second GUI by applying a distortion function defining said lens surface to said second GUI.

Preferably, the lens surface is a folded lens surface.

Preferably, the folded lens surface includes a focal region and a base region and said focal region is folded away from said predetermined elements relative to said base region.

Preferably, the step of creating further includes displaying a third GUI over said distorted region for adjusting said lens surface.

Preferably, the third GUI includes: a slide bar icon for adjusting a magnification for said lens surface; a slide bar icon for adjusting a degree of scooping for said lens surface; a bounding rectangle icon with at least one handle icon for adjusting a size and a shape for said focal region; a bounding rectangle icon with at least one handle icon for adjusting a size and a shape for said base region; a move icon for adjusting a location for said lens surface within said second GUI; a pickup icon for adjusting a location for said base region within said second GUI; and, a fold icon for adjusting a location for said focal region relative to said base region.

Preferably, the first GUI is a desktop GUI.

Preferably, the predetermined elements are predetermined icons in said desktop GUI.

Preferably, the first GUI is a menu.

Preferably, the menu includes a pop-up menu and a pull-down menu.

Preferably, the predetermined elements are predetermined items in said menu.

Preferably, the second GUI is a menu.

Preferably, the menu includes a pop-up menu and a pull-down menu.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE PREFERRED EMBODIMENTS

Figure 1:
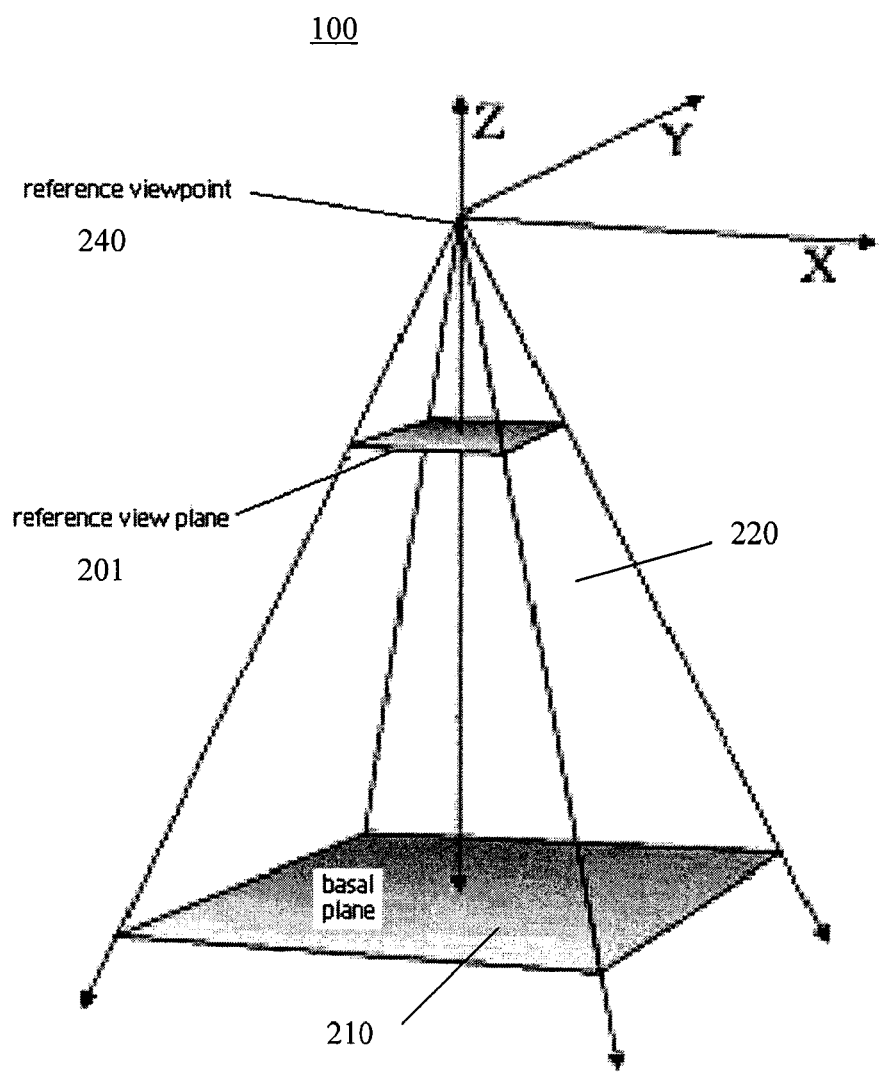
FIG. 1 is a graphical representation of the geometry for constructing a three-dimensional (3D) perspective viewing frustum, relative to an x, y, z coordinate system, in accordance with known elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems, gaming consoles, and network arrangements described herein.

The "screen real estate problem" mentioned above generally arises whenever large amounts of information are to be displayed on a display screen of limited size. Well-known tools to address this problem include panning and zooming. While these tools are suitable for a large number of visual display applications, they become less effective where sections of the visual information are spatially related, such as in maps, three-dimensional representations, video games, and newspapers, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
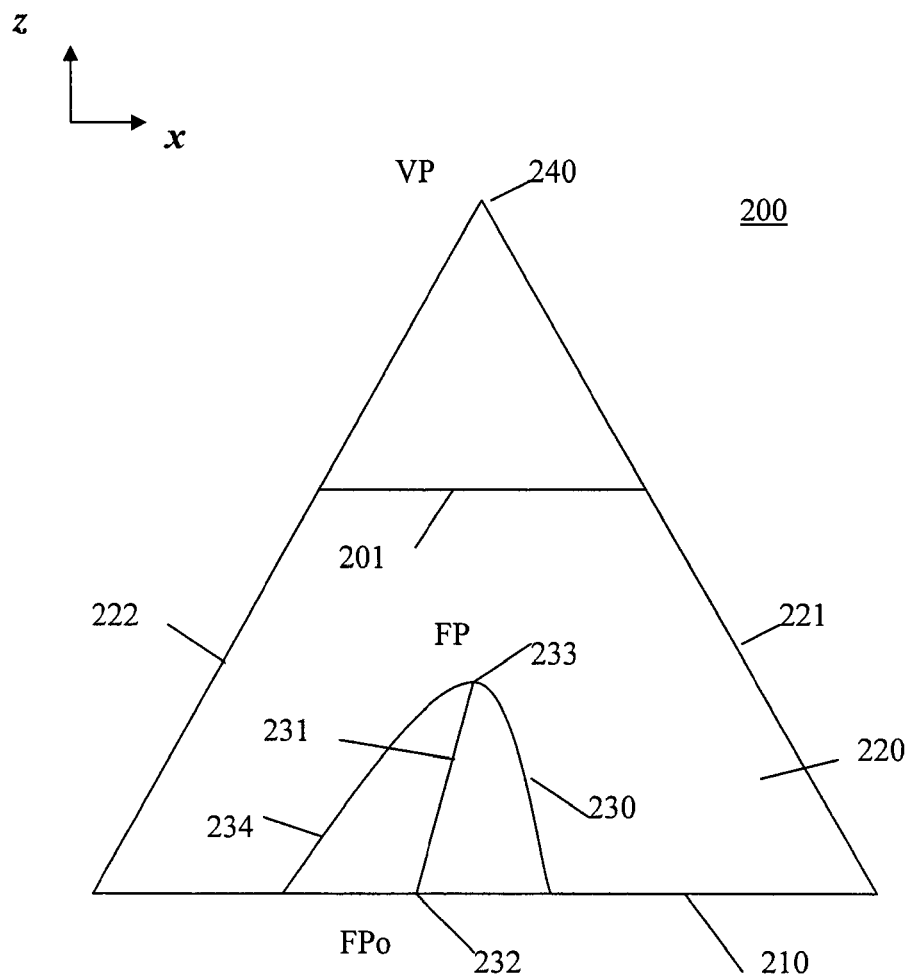
FIG. 2 is a graphical representation of the geometry of a presentation in accordance with known elastic presentation space graphics technology.

FIG. 2 is a graphical representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

System.

Figure 3:
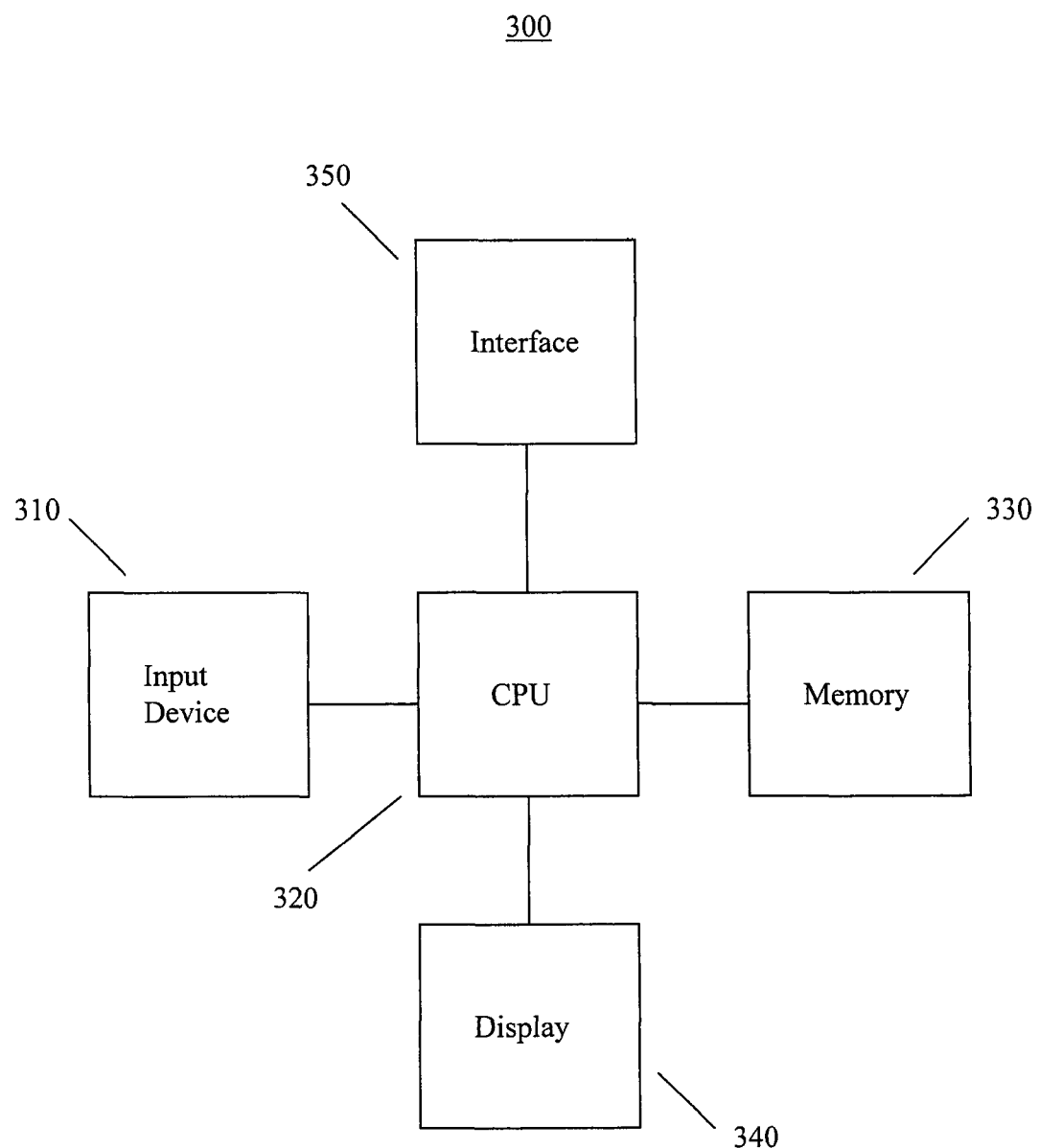
FIG. 3 is a block diagram illustrating a data processing system adapted for implementing an embodiment of the invention.

FIG. 3 is a block diagram of a data processing system 300 adapted to implement an embodiment of the invention. The data processing system is suitable for implementing EPS technology, for displaying detail-in-context presentations of representations, for viewing DVDs, videos, television programmes, and for playing computer games in conjunction with a detail-in-context graphical user interface ("GUI") 400, as described below. The data processing system 300 includes an input device 310, a central processing unit or CPU 320, memory 330, a display 340, and a media interface 350. The input device 310 may include a keyboard, mouse, trackball, remote control, or similar device. The CPU 320 may include dedicated coprocessors and memory devices. The memory 330 may include RAM, ROM, or disk devices. The display 340 may include a computer screen, terminal device, or a hardcopy producing output device such as a printer or plotter. And, the media interface 350 may include a network connection including an Internet connection, a cable television connection, a satellite television connection, a DVD player, a video cassette player, or a gaming console. The data processing system 300 may be a gaming console or multimedia enabled personal computer. The data processing system 300 has stored therein data representing sequences of instructions which when executed cause the method described herein to be performed. Of course, the data processing system 300 may contain additional software and hardware a description of which is not necessary for understanding the invention.

GUI with Lens Control Elements.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the control of detail-in-context data presentations. The software can be loaded into and run by the data processing system 300 of FIG. 3.

Figure 4:
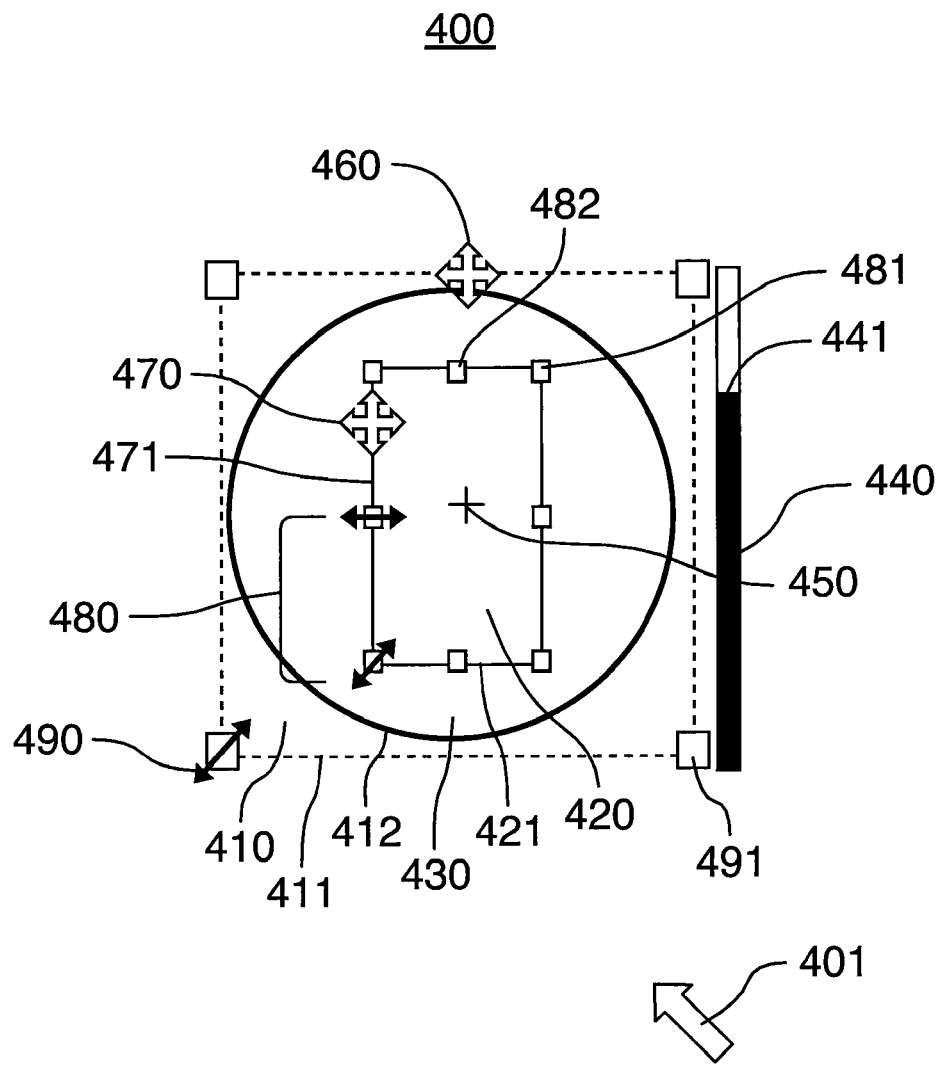
FIG. 4 is a partial screen capture illustrating a GUI having lens control elements for user interaction with detail-in-context data presentations in accordance with an embodiment of the invention.

FIG. 4 is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. For example, in FIG. 5, the lens 410 has a pyramid shape with a flat top 420 and trapezoidal shoulders 430. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, magnify slide bar icon 440, and scoop slide bar icon 540 (see FIG. 5). Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440, 540. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Move.

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 440, 540. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 at the cursor location (e.g. near the centre of the lens 410). Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base.

Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles (not shown) will change the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle (not shown) may include arrows indicating width resizing or height resizing. After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resize Focus.

Resizing of the focal region 420 of a lens 410 is provided by the resize focus lens control element of the GUI. After the lens 410 is selected, a bounding rectangle icon 421 is displayed surrounding the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold.

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401.

The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify.

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Scoop.

The concavity or "scoop" of the shoulder region 430 of the lens 410 is provided by the scoop lens control element of the GUI. After the lens 410 is selected, the scoop control is presented to the user as a slide bar icon 540 (see FIG. 5) near or adjacent to the lens 410 and typically below the lens 410. Sliding the bar 541 of the slide bar 540 results in a proportional change in the concavity or scoop of the shoulder region 430 of the lens 410. The slide bar 540 not only informs the user that the shape of the shoulder region 430 of the lens 410 may be selected, but also provides the user with an indication as to what degree of shaping is possible. The slide bar 540 includes a bar 541 that may be slid left and right, or up and down, to adjust and indicate the degree of scooping. To control the degree of scooping, the user would click on the bar 541 of the slide bar 540 and drag in the direction of desired scooping degree. Once the desired degree of scooping is reached, the user would release the mouse button 310. The lens 410 is then locked with the selected scoop until a further scooping operation is performed.

Icon Hiding.

Figure 5:
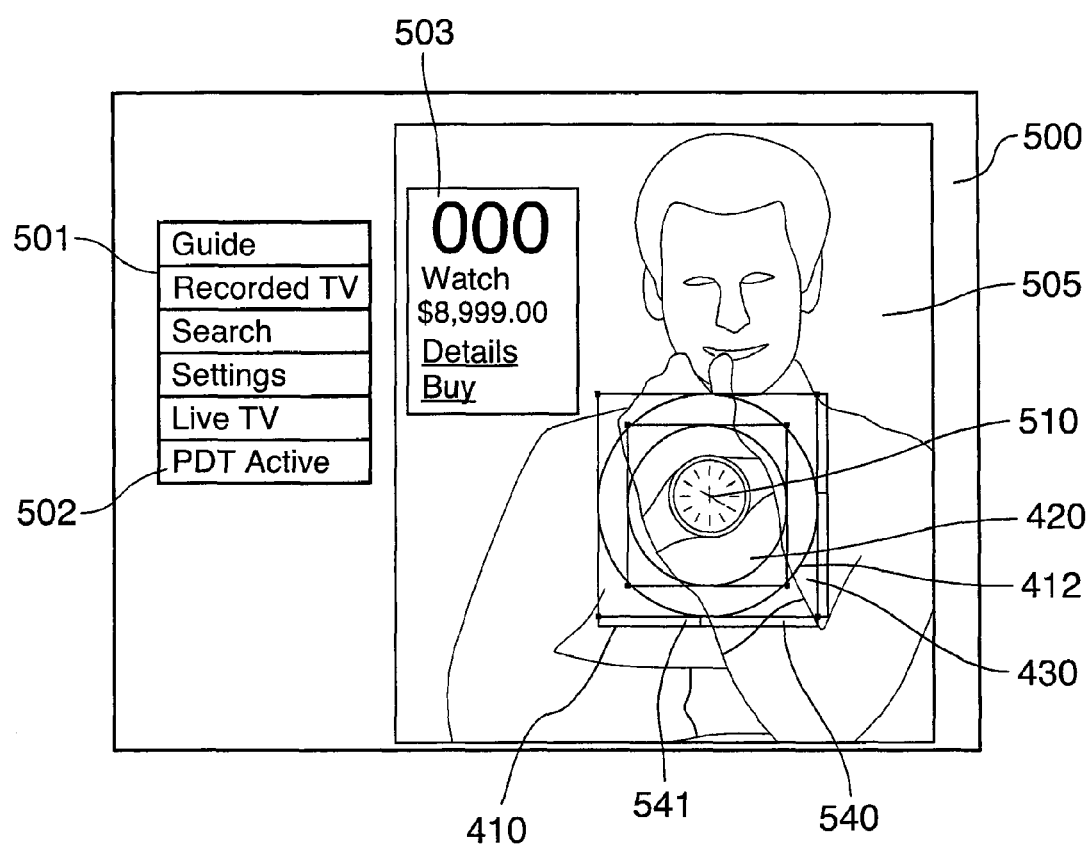
FIG. 5 is a screen capture illustrating the attachment of a lens to a selected object in an original image to produce a detail-in-context presentation to facilitate electronic shopping in accordance with an embodiment of the invention.

Advantageously, a user may choose to hide one or more lens control icons 450, 412, 411, 421, 481, 482, 491, 440, 540 shown in FIGS. 4 and 5 from view so as not to impede the user's view of the image within the lens 410. This may be helpful, for example, during a move or selection operation. A user may select this option through means such as a menu or lens property dialog box.

Electronic Shopping with Detail-in-Context Lenses.

Now, in accordance with an embodiment of the present invention, detail-in-context data viewing techniques are applied to digital image presentations in electronic shopping applications. Detail-in-context data viewing techniques allow a user to view multiple levels of detail or resolution on one display 340. The appearance of the data display or presentation is that of one or more virtual lens showing detail 233 within the context of a larger area view 210. As will be described, detail-in-context lenses may be used to facilitate direct interaction with electronic shopping applications. In addition, detail-in-context lenses may act as portals or interfaces to networked and local sources of information including shopping networks, financial networks, and local information sources.

FIG. 5 is a screen capture illustrating the attachment of a lens 410 to a selected object 510 in an original image to produce a detail-in-context presentation 505 to facilitate electronic shopping in accordance with an embodiment of the invention. In FIG. 5, the selected object 510 is a celebrity's wrist watch and the original image (not shown) is a digital image (e.g. a television program) displayed within a window 500 on a display screen 340. Along with the window 500 and detail-in-context presentation 505, a toolbar icon 501 is presented to the user on the display screen 340. The toolbar icon 501 includes an activation icon 502 (e.g. "PDT Active") for initiating the attachment of the lens 410 to the selected object 510 and/or for initiating an electronic shopping application.

When a lens 410 is placed over an area of interest 510, a user can interact with the lens directly either via a pointing device (e.g. a mouse or stylus) or a remote control device (e.g. a television remote control unit, a wireless controlling device including a tablet or handheld computer, etc.) 310. The lens 410 can be activated while the user is viewing a television program to allow the user to view items of interest 510 in much greater detail without having to leave the program to select another application. In addition to viewing the item in greater detail, the user can select and directly interact with the item of interest 510.

For example, a user watching a television program, DVD, or video can view a watch 510 or other item that a celebrity is wearing, in real-time and with improved detail, without having to switch channels or stop the program. This interaction is an improvement over simply clicking on the watch 510 and having a window pop up showing a static image of the watch. With the lens 410, a user can view the exact item 510 as it appears on screen 340 in real-time. Furthermore, the lens 410 may move in real-time with the item 510 it is associated with.

Using a remote control device 310, the user can directly control the lens 410 and place it over different items of interest 510 or have the lens scripted to move over different items. Multiple lenses 410 can be used and controlled. In addition, using the lens interface, not only can the item of interest 510 be viewed in greater detail but, detailed information 503 pertaining to the item 510 can be viewed. This detailed information 503 may be presented in a pop-up window adjacent to the lens 410 and may include information such as the brand, model, and price of the selected item 510.

The detailed information 503 can include mechanisms (e.g. icons, application interfaces, etc.) for initiating a direct electronic purchase or for the placing of a link to the item 510 in an electronic "shopping cart" for subsequent purchase. The lens 410 or detailed information 503 can also interface with stored user profiles. These profiles, which store information about the user (e.g. account number, payment method preference, delivery address, etc.), can be read by the lens interface for submission to an external electronic shopping application or network to identify and authenticate the user. The external electronic shopping network may be an Internet based network known to those skilled in the art.

The detailed information 503 for selected objects 510 may be stored in the DVD, video, television program, and/or in a database stored in the computer's memory 330. The detailed information 503 is linked to objects 510 presented to users via the display screen 340 by known methods. For example, spatial coordinates for objects 510 in the presentation 505 may be associated with the corresponding detailed information 503 in the DVD or database 330. This association may be made manually by an editor when the DVD, video, or television program product is created.

For example, the present invention may be used in conjunction with Windows XP Media Center™ for: detail-in-context viewing of television programs; interaction with live television programs; encouraging purchases within television programs without leaving the program; and, shopping within television programs through interfaces with MSN Shopping™ via .NET Web Services™. With the present invention, a user can: watch a favourite television show; view a item 510 (e.g. a watch) worn by a favourite celebrity with great detail using detail-in-context lenses 410 and within the context of a television program 505; and, gain instant access to electronic shopping applications via MSN Shopping™ and NET Web Services™ using a lens interface 503 and stored "Passport" profiles. For example, a user may use a remote control or tablet control 310 to activate 502 a detail-in-context lens presentation 505, clearly view an item of interest 510, and purchase the item 510 via an MSN Shopping™ interface 503, all without leaving the context of the television program or its celebrities.

As mentioned above, a user typically interacts with a GUI by using a pointing device (e.g., a mouse) 310 to position a pointer or cursor 401 over an object and "clicking" on the object. Thus, an electronic shopping operation may be initiated by selection from a toolbar 501 or by selecting an object 510 within the original image. The pointing device (e.g. mouse) 310 is used to select an object 510 (e.g., icons, graphical objects, etc.) under a cursor 401. Selecting may be initiated by holding down a button associated with the pointing device (e.g., a mouse button) 310 and gesturing with the pointing device 310 to indicate the bounds of the object 510 to be selected (as in a area or region selection), or simply by "clicking" on the object 510 under the cursor 401 (as in graphical object or icon selection). Selection may be indicated by a change in the visual display of the selected object 510 (e.g., by using reverse video, displaying a frame around the object, displaying selection handles around the object, etc.).

Once an object 510 is selected, a lens 410 is attached to the object 510. Any point on the selected object 510 may be chosen to be in the centre of the lens focus 420. In FIG. 5, the centre of the focus 420 of the lens 410 is attached to the approximate centre of the watch 510. The lens 410 may be configured using its associated GUI 400 in the manner described above. That is, the shape, size, magnification, scoop, and fold for the lens 410 may all be carefully tuned for the selected object 510. The lens 410 may be configured before attachment to the selected object 510 or after attachment. In addition, the lens 410 may be displayed before the object 510 is selected to aid in the selection of the object 510.

As the object 510 moves, the lens 410 moves with it. Alternatively, the lens 410 may be thought of as carrying the object 510, that is, the object 510 may be attached to the lens 410 such that as the lens 410 moves, the object 910 moves with it. Advantageously, since the magnification at the focus 420 of the lens 410 is greater than that at the base of the lens 410, the lens 410 may be used to select an object 510 in the presentation 505 with improved accuracy. In addition, the user is assisted throughout this selection operation by being able to observe the detail in the lens focus 420 in the context of the surrounding presentation 505.

In operation, the data processing system 300 employs EPS techniques with an input device 310 and GUI 400 for selecting an object 510 for display to a user on a display screen 340 and for which an electronic shopping operation will be performed. Data representing an original image (not shown) or representation is received by the CPU 320 of the data processing system 300. Using EPS techniques, the CPU 320 processes the data in accordance with instructions received from the user via an input device 310 and GUI 400 to produce a detail-in-context presentation 505. The presentation 505 is presented to the user on a display screen 340. It will be understood that the CPU 320 may apply a transformation to the shoulder region 430 surrounding the region-of-interest 420 to affect blending or folding in accordance with EPS technology. For example, the transformation may map the region-of-interest 420 and/or shoulder region 430 to a predefined lens surface, defined by a transformation or distortion function and having a variety of shapes, using EPS techniques. Or, the lens 410 may be simply coextensive with the region-of-interest 420. (Blending and folding of lenses in detail-in-context presentations are described in United States Patent Application Publication No. 2002/0044154 which is incorporated herein by reference.)

The lens control elements of the GUI 400 are adjusted by the user via an input device 310 to control the characteristics of the lens 410 in the detail-in-context presentation 505. Using an input device 310 such as a mouse, a user adjusts parameters of the lens 410 using icons and scroll bars of the GUI 400 that are displayed over the lens on the display screen 340. The user may also adjust parameters of the image of the full scene 505 using selections from the toolbar icon 501. Signals representing input device 310 movements and selections are transmitted to the CPU 320 of the data processing system 300 where they are translated into instructions for lens and image control.

Advantageously, by using a detail-in-context lens 410 to select an object 510 for an electronic shopping operation, a user can view a large area 505 (i.e. outside the lens 410) while focusing in on a smaller area 420 (i.e. inside the focal region 420 of the lens 410) surrounding the selected object 510. This makes it possible for a user to perform an electronic shopping operation without losing visibility or context of the portion of the original image surrounding the selected object 510. The selected object 510 may be viewed by the user as it is actually used by a character in the presentation 505. In this way, the "context" of the selected object 510 is also enhanced for the user. For example, the watch 510 is observed on a character's wrist while the character is in action rather than in a static "display case" like presentation.

Moreover, the lens 410 may be added to the presentation 505 before or after the object 510 is selected. That is, the user may first add a lens 410 to a presentation 505 or the user may move a pre-existing lens into place at, say, a selected point on an object 510. The lens 410 may be introduced to the original image (not shown) to form the presentation 505 through the use of a pull-down menu selection, tool bar icon 502, etc. The electronic shopping operation may then be activated using a toolbar selection or with a double click on the selected object 510. Now, as the selected object 510 moves to new locations within the presentation 505, the lens 410 is presented over and moves with the object 510.

Video Game Control with Detail-in-Context Lenses.

Figure 6:
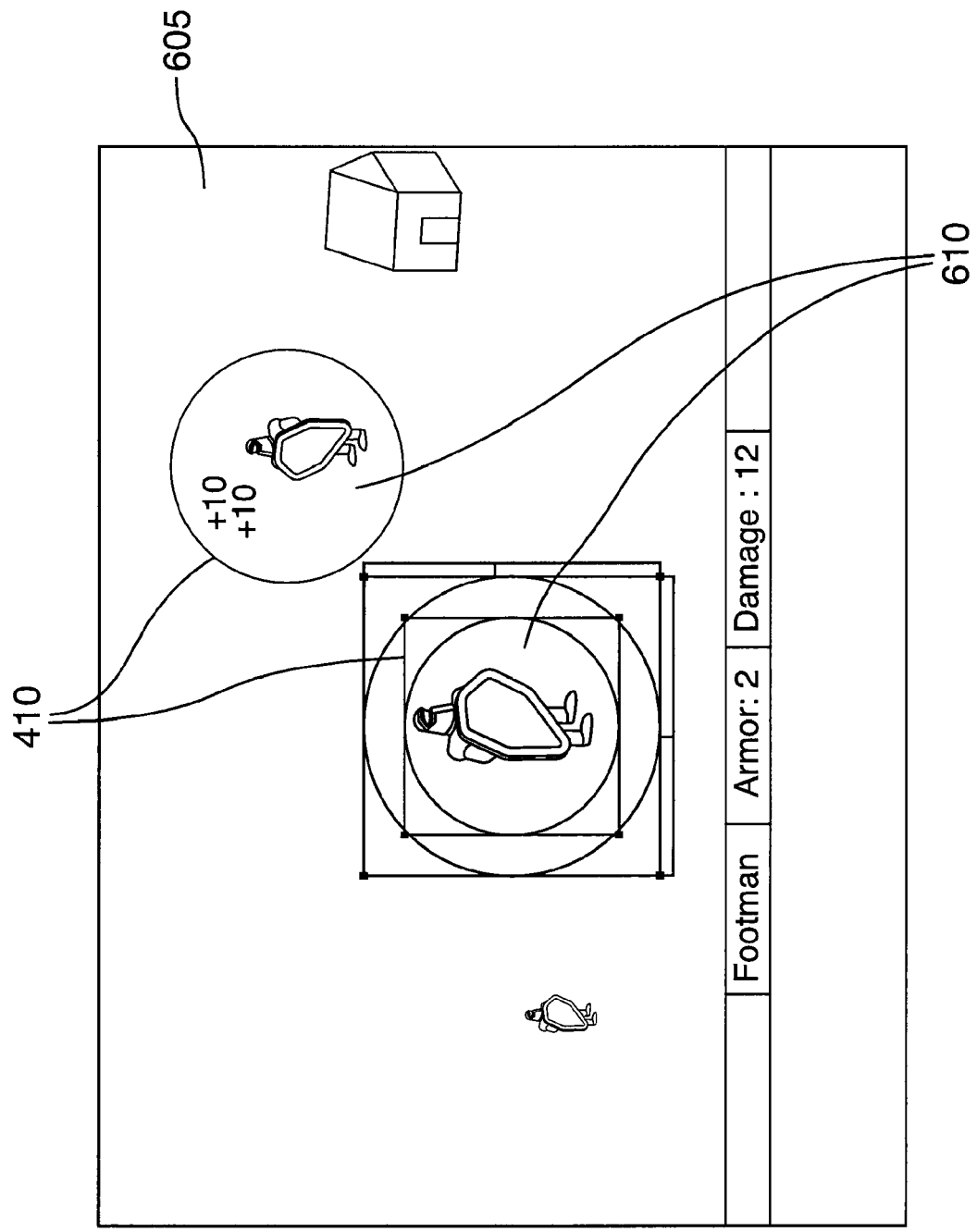
FIG. 6 is a screen capture illustrating the application of lenses in multi-player video games in accordance with an embodiment of the invention.

According to another embodiment of the present invention, detail-in-context lenses and PDT are applied in gaming consoles such as Microsoft's Xbox™. These gaming consoles are often positioned as general-purpose entertainment devices and can benefit from the application of PDT. FIG. 6 is a screen capture illustrating the application of detail-in-context lenses 410 in multi-player video games in accordance with an embodiment of the invention. In FIG. 6, lenses 410 are applied to game characters 610 to produce a detail-in-context video game presentation 605.

For example, with respect to the movement of gaming consoles towards a more general-purpose home entertainment platform, PDT provides the following functionality gains: enables more powerful online collaboration and multiplayer gaming capabilities; digital image editing and management; interactive television/web browsing; interactive advertising; and, it can function as a narrative/presentation tool or scripted communication tool. In addition, with respect to information storage, cataloging, and data management in Xbox™, PDT provides the following functionality gains: digital image management; viewing of different content layers and overlays brought into the lens at various scales; and, more efficient navigation of "cluttered" information, cataloging of song titles, movie titles, etc. With respect to image manipulation and presentation tools in Xbox™, PDT provides the following functionality gains: a powerful presentation tool that highlights area of interest; editing of images and models; and, 2D and 3D narration or scripting. With respect to the product developer, testing, animation, designer, and authoring tools in Xbox™, PDT provides: efficient detail-in-context viewing and in-place editing workspace for people that are spatially restricted within their on-screen 2D and 3D workspaces; and, a presentation/communication tool to help create, modify, test, and inspect graphics for quality control purposes. With respect to video games in Xbox™ (e.g. Strategy Puzzle, First Person Shooter, Role Playing, Flight Simulator, Action/Adventure, etc.), PDT provides: use of PDT for "cool" visual effects; increasing functionality of editing packages and tools used to create new worlds; adding to existing zooming and panning capabilities within games; and, an new mode of co-located multiplayer and online multiplayer interactivity. And, with respect to multi-player collaboration in Xbox™, PDT provides: a new mode of co-located multiplayer and online multiplayer interactivity; "cool" new special effects that are ideal for enhancement of narrative capabilities, increasing the draw-in rate of first person shooter games by allowing players to "see" further in front of a view, and detail-in-context viewing for role playing games where players are required to be aware of their surroundings at all times; increased functionality of editing packages and tools available to create and explore new worlds; additions to existing zooming and panning capabilities; and, as games migrate to handsets and PDA's, aid in the change of content and display of games.

In addition, using the lens interface, not only can a video game character 610 be viewed in greater detail but, detailed information 503 pertaining to the character 610 can be viewed. This detailed information 503 may be presented in a pop-up window and may include information such as available powers, weapons, reserves, points, skills, controls, etc., for the character 610. Similar to the interface described above for linking to an external electronic shopping application, the detailed information 503 may include control icons and may provide an interface to an external gaming application available through a network such as the Internet.

Advertising with Detail-in-Context Lenses.

Figure 7:
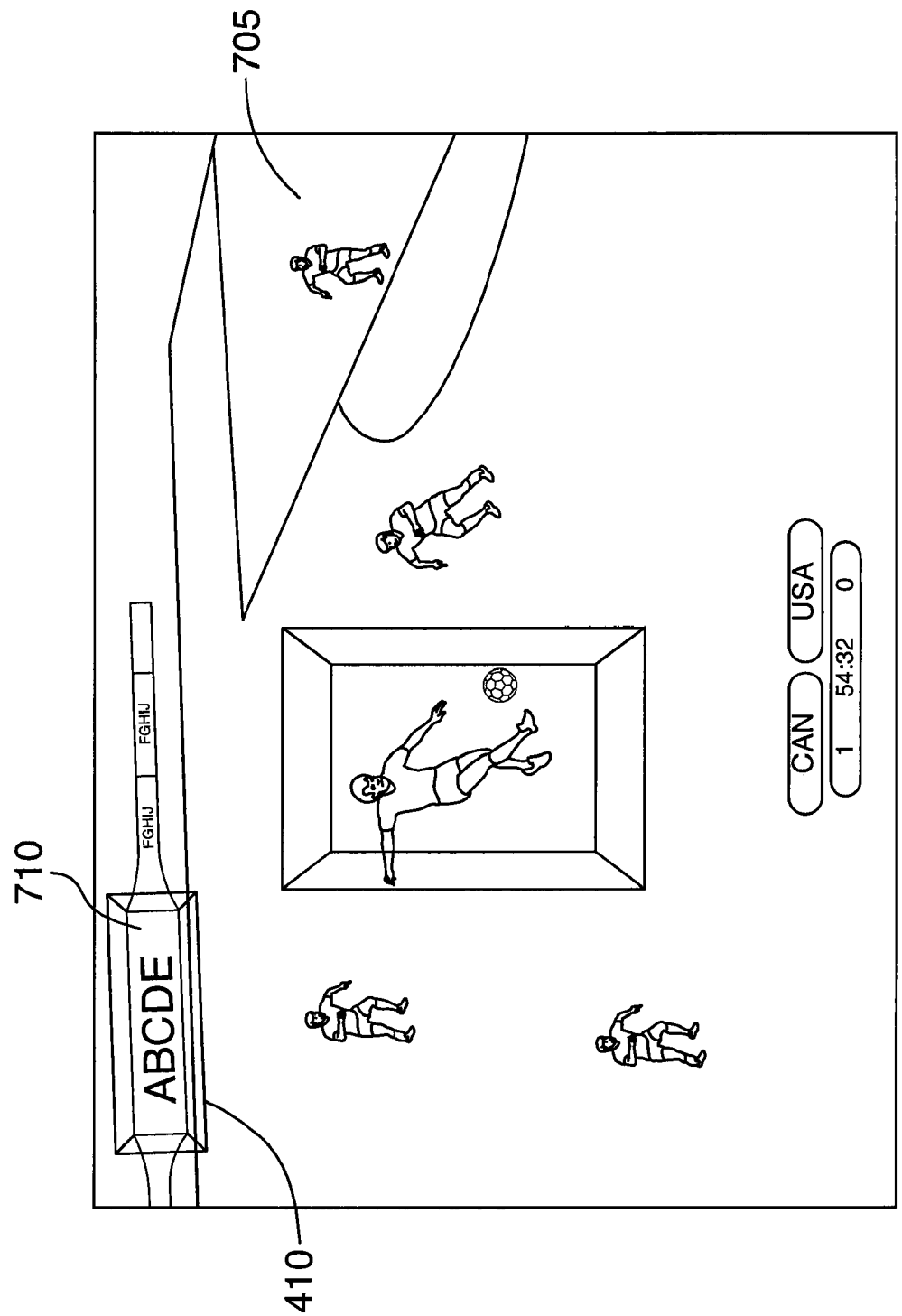
FIG. 7 is a screen capture illustrating a lens applied to an advertisement in a video game in accordance with an embodiment of the invention.

According to another embodiment of the present invention, detail-in-context lenses and PDT are applied to advertising within digital media presentations. Detail-in-context lenses can be applied not only to television programs but also to other digital media presentations such as DVDs and video games. FIG. 7 is a screen capture illustrating a lens 410 applied to an advertisement 710 (e.g. a Yahoo™ banner) in a video game in accordance with an embodiment of the invention. In FIG. 7, the advertisement 710 is a Yahoo™ banner positioned along the sidelines of a soccer field in a soccer video game. The lens 410 is applied to an advertisement 710 to produce a detail-in-context advertising presentation 705. The lens 410 can move with the action in the video game such that paid sponsors can have their banners 710, which are positioned in the background of the game presentation, highlighted and thus given attention as the game progresses. In other words, the lens 410 serves as a highlighting medium or spotlight to draw the user's attention to the advertised item 710. This improves user interaction with the advertisement as will be described below.

With respect to advertising in Xbox™, for example, a scripted lens 410 can move with the action to highlight advertising banners 710 for paid sponsors. As the game player progresses towards the goal, sequential banners 710 (e.g. Yahoo™, Toshiba™, etc.) are magnified or highlighted by the lens 410. In this way, the advertisements 710 follow the game play. Alternatively, a selected banner 710 may be stretched or deformed in the direction of play by the lens.

In addition, using the lens interface, not only can the advertisement 710 be viewed in greater detail but, detailed information 503 pertaining to the advertisement 710 can be viewed. This detailed information 503 may be presented in a pop-up window and may include information such as the brand, model, and price of the advertised item 710. As described above, the detailed information 503 may provide an interface to an external electronic shopping application.

Application Control with Detail-in-Context Lenses.

Figure 8:
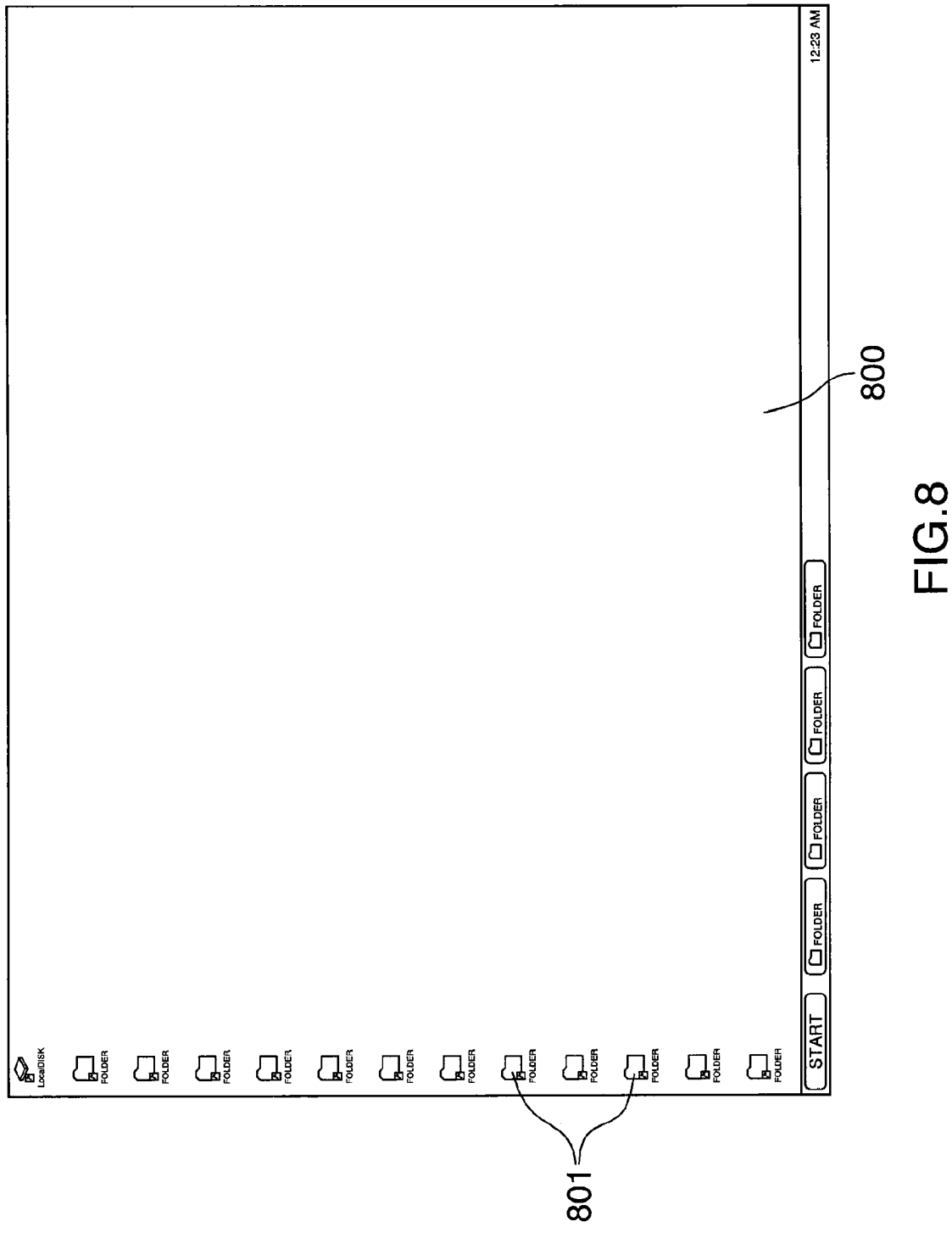
FIG. 8 is a screen capture illustrating a known operating system GUI having various desktop icons.
Figure 9:
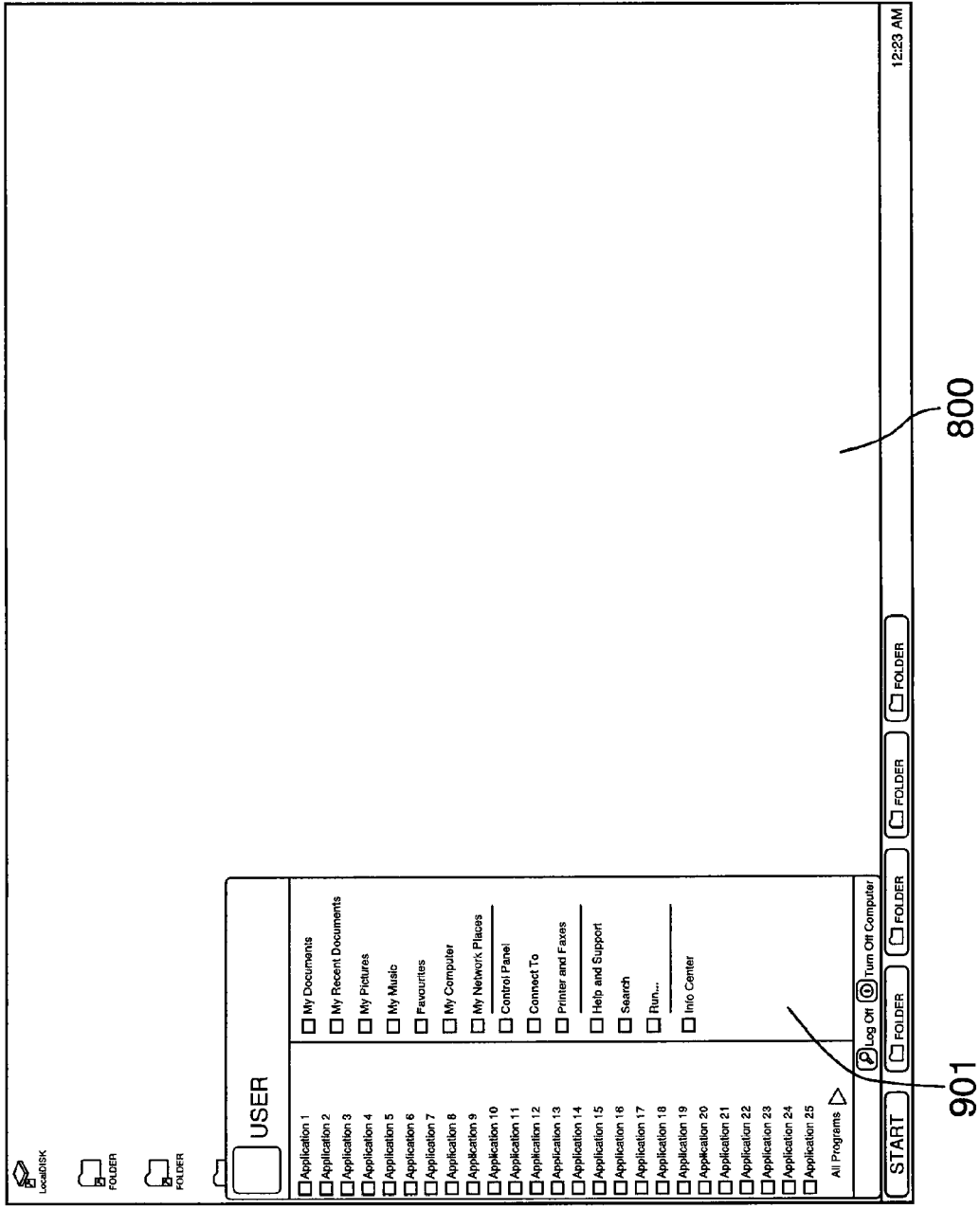
FIG. 9 is a screen capture illustrating the operating system GUI of FIG. 8 with an overlaid pop-up menu.

As mentioned, one shortcoming of present graphical user interfaces for operating systems and software applications is that user interface elements such as pop-up and drop-down menus comprising lists of programs (i.e. in the case of operating systems) and function selections (i.e. in the case of software applications) often obscure or occlude other important information on the user's display screen including data, desktop icons, and other graphical elements. Consider FIGS. 8 and 9. FIG. 8 is a screen capture illustrating a known operating system GUI 800 having various desktop icons 801. FIG. 9 is a screen capture illustrating the operating system GUI 800 of FIG. 8 with an overlaid pop-up menu 901. The appearance of the pop-up menu 901 (e.g. a "start menu") in FIG. 9 has occluded the visibility of several of the desktop icons 801 shown in FIG. 8. The pop-up menu 901 may appear upon user selection of one of the desktop icons 801, for example.

As described by Carpendale and referring again to FIG. 2, EPS technology includes a technique referred to as "folding" in which an in-context detail view of information can be displaced so as to move the region-of-interest 233 within the plane 201 of the display while maintaining a continuous connection with at least some of the contextual information 210. In other words, the region-of-interest is folded over a portion of the visual information comprising the area surrounding the region-of-interest. According to one embodiment of the present invention, a novel form of folding is applied to an operating system GUI 800 to create an operating system GUI presentation in which occluded user interface elements (e.g. pop-up windows) 901 are distorted to expose underlying information or graphical elements (e.g. desktop icons) 801.

Figure 10:
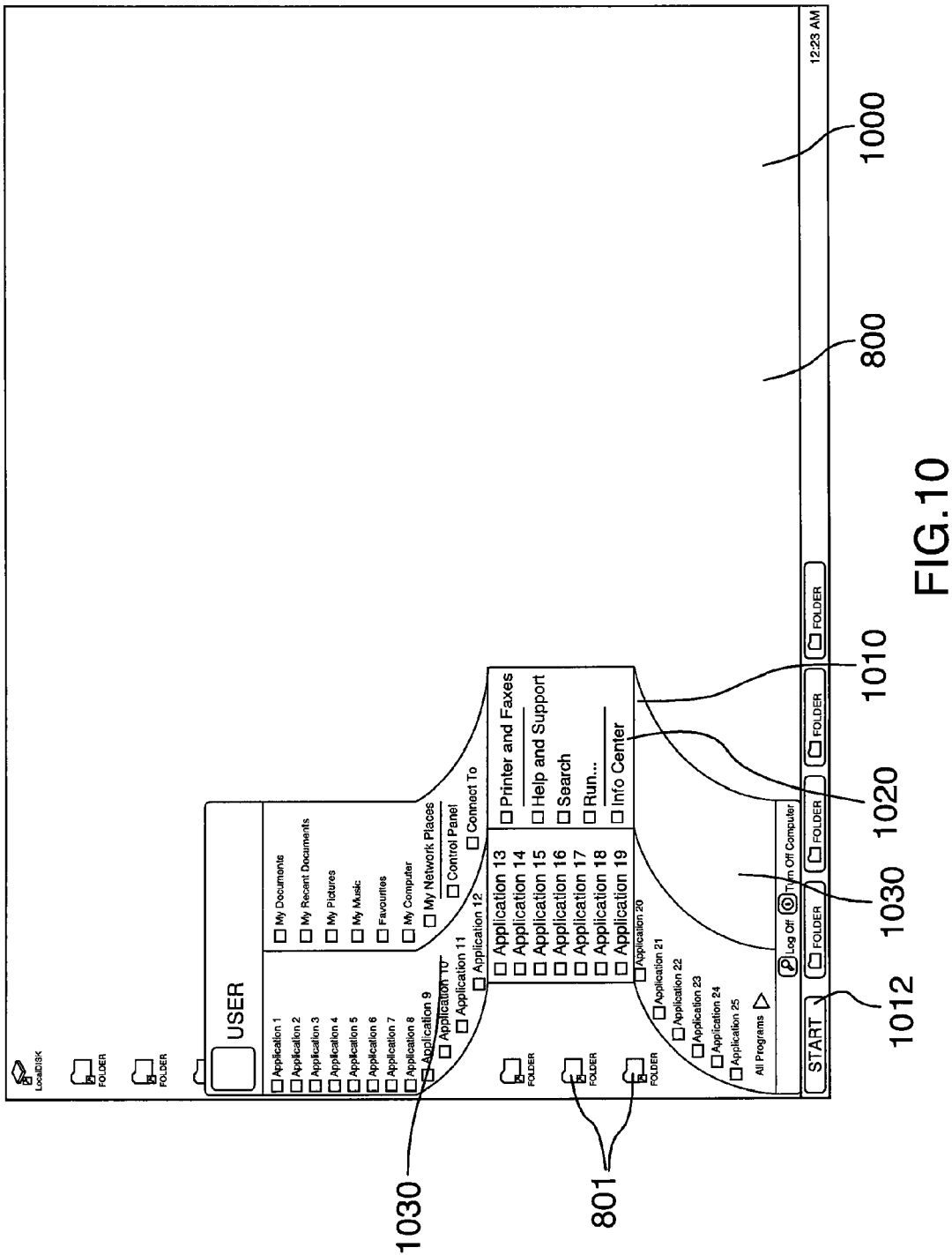
FIG. 10 is a screen capture illustrating an operating system GUI presentation in which detail-in-context folding is applied in accordance with an embodiment of the invention.

FIG. 10 is a screen capture illustrating an operating system GUI presentation 1000 in which detail-in-context folding is applied in accordance with an embodiment of the invention. In FIG. 10, the operating system is Microsoft XP™. A copy of the initial desktop 800 as illustrated in FIG. 8, prior to invoking the pop-up menu 901 illustrated in FIG. 9, is retained to facilitate display of the original icons 801 in the resultant folded GUI presentation 1000. The operating system GUI presentation 1000 is created by applying a detail-in-context lens to the pop-up menu 901 and then overlaying the resultant distorted pop-up menu 1010 on the original desktop 800. In this way, predetermined ones of the original desktop icons 801 remain visible. In FIG. 10, the lens applied to the pop-up menu 901 has a flat, rectangular shaped top or focal region 1020 and two scooped sides or shoulders 1030 which terminate at the base 1012 of the lens. The focal region 1020 is folded away from the original desktop icons 801, relative to the lens base 1012, toward the right-hand side of the desktop 800. The extent of the focal region 1020 and the degree of scooping 1030 may be selected automatically by the system 300 or the may be customized through use of a GUI 400 such as that illustrated in FIG. 4 and described above. Similarly, detail-in-context folding can also be applied to a pull-down (or drop-down) menu in a GUI for an application to prevent or remove occlusion of program related data. By folding menus in this way, a current menu 901 may be viewed in the context of underlying icons or menus 801.

Method.

Figure 11:
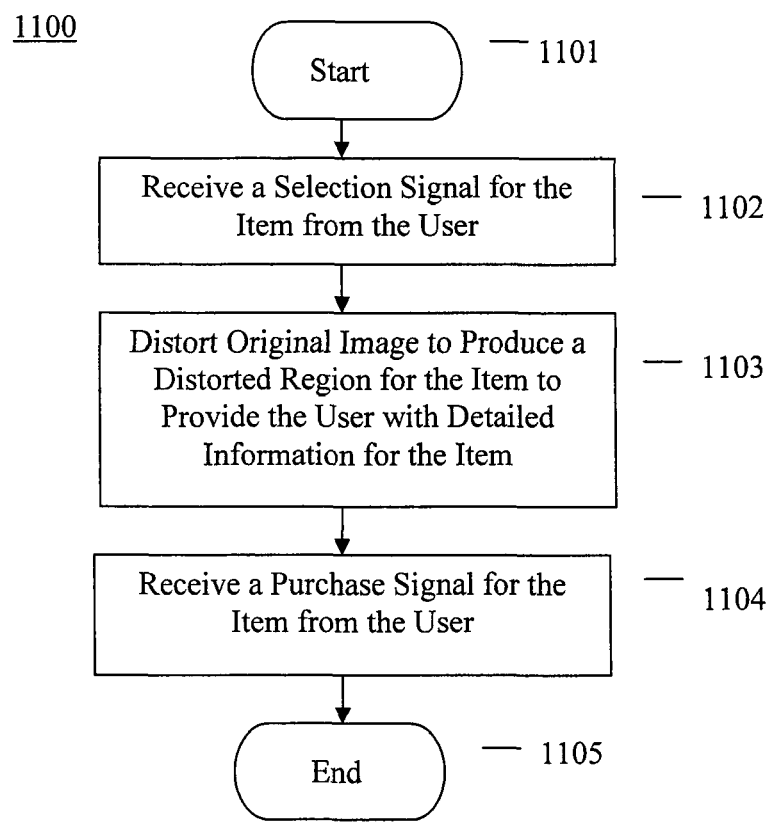
FIG. 11 is a flow chart illustrating a method for initiating an electronic shopping transaction for a user-selectable item presented in a computer generated original image on a display in accordance with an embodiment of the invention; and, FIG. 12 is a flow chart illustrating a method for presenting a second GUI over a first GUI on a computer display to avoid occlusion of predetermined elements of the first GUI in accordance with an embodiment of the invention.

With respect to electronic shopping with detail-in-context lenses, FIG. 11 is a flow chart 1100 illustrating a method for initiating an electronic shopping transaction for a user-selectable item 510 presented in a computer generated original image on a display 340 in accordance with an embodiment of the invention.

At step 1101, the method starts.

At step 1102, a selection signal is received for the item 510 from a user. The selection signal may be generated by moving a cursor 401 on the display 340 with a pointing device 310, such as a mouse, and clicking on the item 510.

At step 1103, the original image is distorted to produce a distorted region 410 for the item 510 to provide the user with detailed information 503 for the item 510. This step of distorting may further includes the steps of: creating a lens surface for the distorted region 410; and, transforming the original image by applying a distortion function defining the lens surface to the original image. The step of creating may further include the step of displaying a GUI 400 over the distorted region 410 for adjusting the lens surface. The original image may be a DVD image, a video cassette image, a cable television image, a satellite television image, or a video game image. The distorted region 410 may be on the item 510 or may overlap the item 510. The detailed information may be the distorted region 410 itself or it may be purchasing information 503 for the item 510. This purchasing information 503 may include a price, a product identifier, a delivery period, and function selection icons for the item 510. The function selection icons may include a purchase icon and an add-to-shopping-cart icon. The purchasing information 503 may be presented in a pop-up window which may be presented adjacent to the distorted region 410 as illustrated in FIG. 5.

At step 1104, a purchase signal is received for the item 510 from the user. The purchase signal may be generated by moving a cursor 401 on the display 340 with a pointing device 310, such as a mouse, and clicking on a purchase or add-to-shopping cart icon. In this way, the electronic shopping transaction is initiated.

At step 1105, the method ends.

Figure 12:
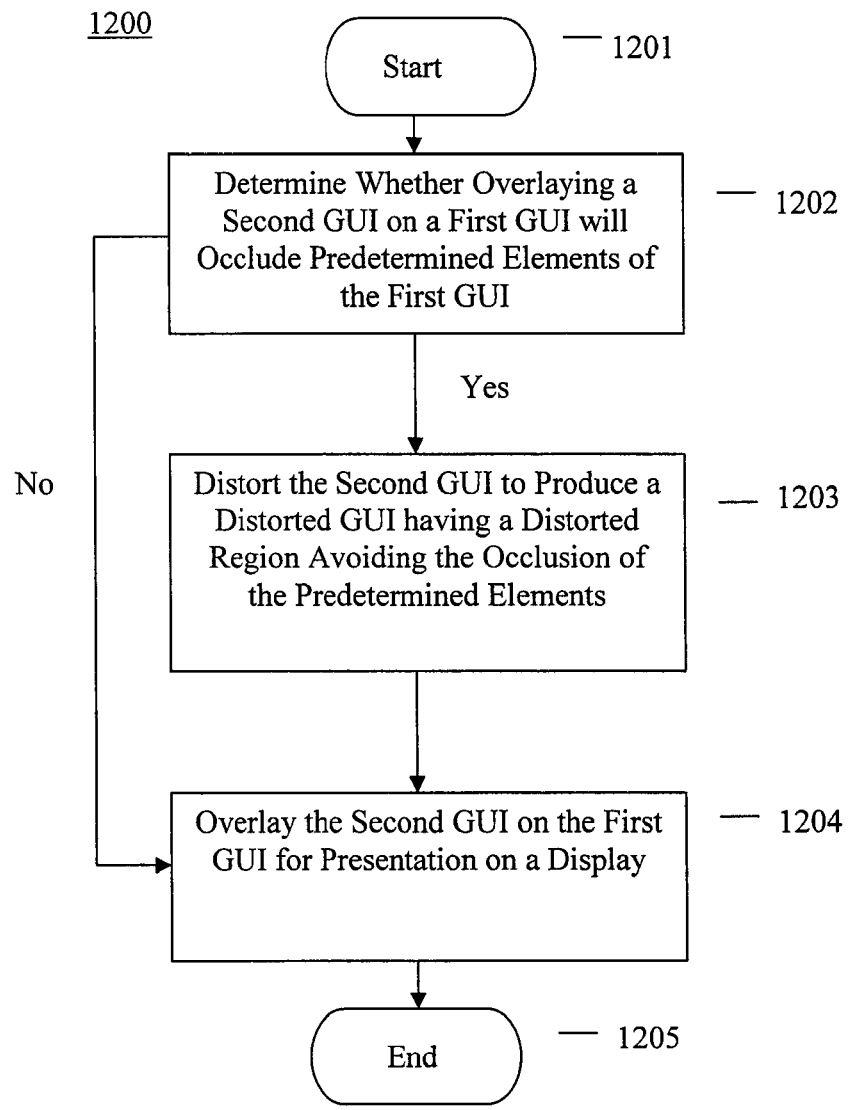

Now, with respect to application control with detail-in-context lenses, FIG. 12 is a flow chart 1200 illustrating a method for presenting a second GUI 901 over a first GUI 800 on a computer display 340 to avoid occlusion of predetermined elements 801 of the first GUI 800 in accordance with an embodiment of the invention.

At step 1201, the method starts.

At step 1202, a determination is made whether overlaying the second GUI 901 on the first GUI 800 will occlude the predetermined elements 801. This may be accomplished, for example, by comparing the x, y coordinates of the predetermined elements 801 and the second GUI 901.

At step 1203, in response to step 1202, if the second GUI 901 will occlude the predetermined elements 801, then the second GUI 901 is distorted to produce a distorted GUI 1010 having a distorted region 1020, 1030 avoiding the occlusion of the predetermined elements 801. This step of distorting may further include the steps of: creating a lens surface for the distorted region 1010; and, transforming the second GUI 901 by applying a distortion function defining the lens surface to the second GUI 901. The lens surface may be a folded lens surface. The folded lens surface may include a focal region 1020 and a base region 1012 where the focal region 1020 is folded away from the predetermined elements 801 relative to the base region 1012. The step of creating may further include the step of displaying a GUI 400 over the distorted region 1010 for adjusting the lens surface. The first GUI may be a desktop GUI 800 and the predetermined elements may be predetermined icons 801 in this desktop GUI 800. Alternatively, the first GUI may be a menu including a pop-up menu and a pull-down menu. In this case, the predetermined elements may be predetermined items in the menu. The second GUI may also be a menu 901 including a pop-up menu and a pull-down menu.

At step 1204, the distorted GUI is overlaid on the first GUI for presentation on the display 340.

At step 1205, the method ends.

Data Carrier Product.

The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product.

The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product.

The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although preferred embodiments of the invention have been described herein, it will be understood by those skilled in the art that variations may be made thereto without departing from the spirit of the invention or the scope of the appended claims.

What is claimed is:

1. A method for arranging a menu for display in an image, wherein the method comprises:
   applying, by a processor to the menu, a lens including:
      a focal region having a magnification,
      a base defining an extent of the lens in the menu having no magnification, and
      a shoulder region between the focal region and the base, wherein the shoulder region provides context for the focal region with respect to a portion of the image outside of the base of the lens by preserving visibility of information in the menu surrounding the focal region by varying magnification between the magnification of the focal region to no magnification at the base; and
   folding, by the processor, the lens away from a portion of underlying image data by shifting the focal region to a side to expose the portion of the underlying image data while still maintaining continuity between the base, the focal region, and the shoulder region.

2. The method of claim 1, further comprising displaying the image data.

3. The method of claim 1, wherein the shoulder region comprises a degree of scooping.

4. The method of claim 1, wherein the menu comprises a pop-up menu.

5. The method of claim 1, wherein the menu comprises a drop-down menu.

6. The method of claim 1, wherein the focal region is rectangular.

7. The method of claim 1, further comprising permitting customization of at least one of an size of the focal region or a degree of scooping of the shoulder region.

8. An apparatus for arranging a menu for display in an image, wherein the apparatus comprises:
   one or more processors together with one or more memories configured to:
      apply, to the menu, a lens including:
         a focal region having a magnification,
         a base defining an extent of the lens in the menu having no magnification, and
         a shoulder region between the focal region and the base, wherein the shoulder region provides context for the focal region with respect to a portion of the image outside of the base of the lens by preserving visibility of information in the menu surrounding the focal region by varying magnification between the magnification of the focal region to no magnification at the base; and
      fold the lens away from a portion of underlying image data by shifting the focal region to a side to expose the portion of the underlying image data while still maintaining continuity between the base, the focal region, and the shoulder region.

9. The apparatus of claim 8, wherein the one or more processors together with the one or more memories are further configured to display the image data.

10. The apparatus of claim 8, wherein the shoulder region comprises a degree of scooping.

11. The apparatus of claim 8, wherein the menu comprises a pop-up menu.

12. The apparatus of claim 8, wherein the menu comprises a drop-down menu.

13. The apparatus of claim 8, wherein the focal region is rectangular.

14. The apparatus of claim 8, wherein the one or more processors together with the one or more memories are further configured to permit customization of at least one of an extent of the focal region or a degree of scooping of the shoulder region.

15. At least one computer-readable device including a set of instructions for execution on one or more processors to arrange a menu for display in an image, wherein the set of instructions comprises:
　application instructions for applying, to the menu, a lens including:
　　a focal region having a magnification,
　　a base defining an extent of the lens in the menu having no magnification, and
　　a shoulder region between the focal region and the base, wherein the shoulder region provides context for the focal region with respect to a portion of the image outside of the base of the lens by preserving visibility of information in the menu surrounding the focal region by varying magnification between the magnification of the focal region to no magnification at the base; and
　folding instructions for folding the lens away from a portion of underlying image data by shifting the focal region to a side to expose the portion of the underlying image data while still maintaining continuity between the base, the focal region, and the shoulder region.

16. The at least one computer-readable device of claim 15, wherein the set of instructions further comprise display instructions for displaying the image data.

17. The at least one computer-readable device of claim 15, wherein the shoulder region comprises a degree of scooping.

18. The at least one computer-readable device of claim 15, wherein the menu comprises a pop-up menu.

19. The at least one computer-readable device of claim 15, wherein the menu comprises a drop-down menu.

20. The at least one computer-readable device of claim 15, wherein the set of instructions further comprise permission instructions for permitting customization of at least one of an extent of the focal region or a degree of scooping of the shoulder region.

* * * * *

UNITED STATES PATENT AND TRADEMARK OFFICE
CERTIFICATE OF CORRECTION

| | | |
|---|---|---|
| PATENT NO. | : 8,577,762 B2 | Page 1 of 1 |
| APPLICATION NO. | : 11/935222 | |
| DATED | : November 5, 2013 | |
| INVENTOR(S) | : Baar et al. | |

It is certified that error appears in the above-identified patent and that said Letters Patent is hereby corrected as shown below:

On Title Page 5, Item (56) "Other Publications", in Column 1, Line 37, delete "software an technology" and insert -- software and technology --, therefor.

In the Specification

In Column 1, Line 24, delete "Modern" and insert -- Modem --, therefor.

In Column 18, Line 28, delete "the may be" and insert -- they may be --, therefor.

In the Claims

In Column 20, Line 38, in Claim 7, delete "an size" and insert -- a size --, therefor.

Signed and Sealed this
Third Day of June, 2014

Michelle K. Lee
*Deputy Director of the United States Patent and Trademark Office*